H. G. OLVER.
CUTTER HEAD FOR MATCHING AND DRESSING LUMBER.
APPLICATION FILED AUG. 3, 1912.

1,068,361. Patented July 22, 1913.
2 SHEETS—SHEET 1.

Witnesses
Harrison Ott
U. B. Hillyard.

Inventor
Hiram G. Olver
By Victor J. Evans
Attorney

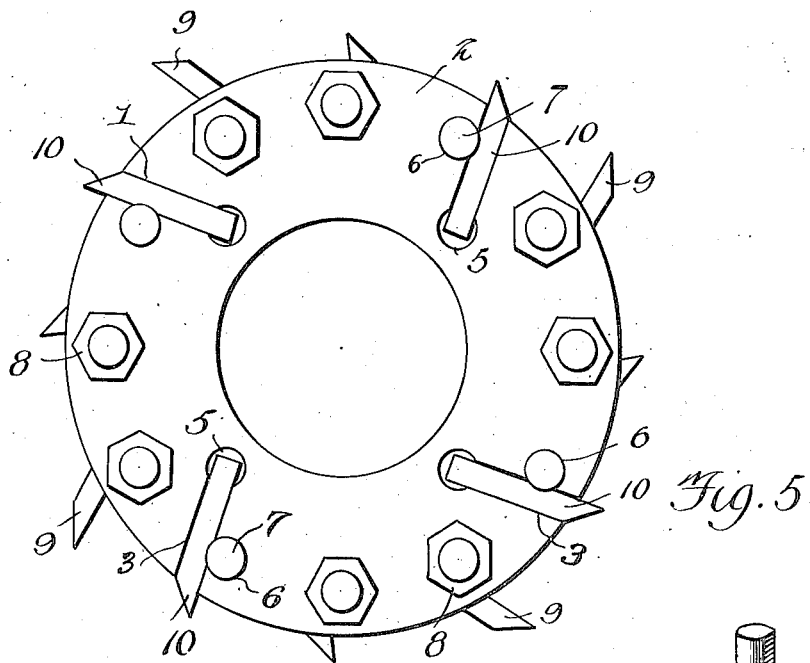
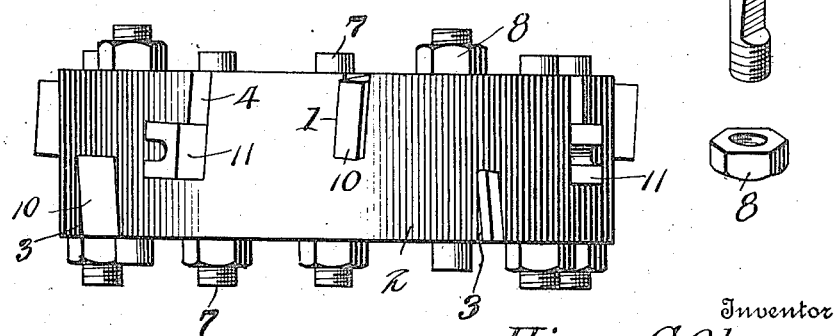

UNITED STATES PATENT OFFICE.

HIRAM G. OLVER, OF LUDINGTON, LOUISIANA.

CUTTER-HEAD FOR MATCHING AND DRESSING LUMBER.

1,068,361.     Specification of Letters Patent.     Patented July 22, 1913.

Application filed August 3, 1912. Serial No. 713,099.

*To all whom it may concern:*

Be it known that I, HIRAM G. OLVER, a citizen of the United States, residing at Ludington, in the parish of Calcasieu and State of Louisiana, have invented new and useful Improvements in Cutter-Heads for Matching and Dressing Lumber, of which the following is a specification.

The present invention provides a cutter head for woodworking machinery designed chiefly for shaping the edges or matching lumber such as tongue and groove boards used for floors, ceilings and partitions, ship lap for use in the construction of vessels and for dressing the edges of boards to present a finished edge.

The invention provides a solid cutter head which will not warp when tightening the bits, the cutter head having slots in opposite sides to receive the bits and also having transverse openings to receive wedge bolts by means of which the bits are made secure and held firmly upon their seats, thereby preventing possible movement or any give of the bits when the cutter head is in operation.

The invention further provides a cutter head having slots in opposite faces, the slots in one face being opposite the spaces between the slots formed in the opposite face, said slots having approximate tangential arrangement and inclining transversely, thereby enabling the bits to operate by a shear action.

A further purpose of the invention is the provision of a cutter head fitted with sets of bits which are arranged in different positions across the face of the cutter head so that a plurality of bits operate upon the edge of a board, with the result of greatly facilitating the work and enabling the cut to be made by stages instead of by means of a single bit extending the full width of the cut.

The invention consists of the novel features, details of construction and combination of parts, which hereinafter will be more particularly set forth, illustrated in the accompanying drawings, and pointed out in the appended claims.

Figure 1:
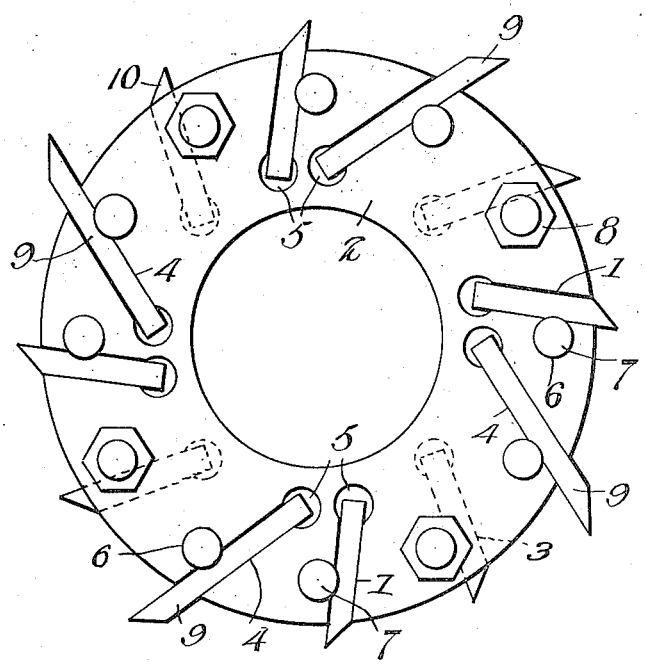
Figure 3:
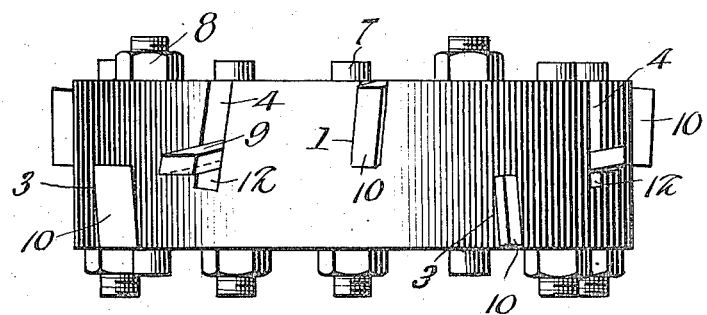

Referring to the drawings, forming a part of the specification, Figures 1 and 2 are respectively obverse and reverse views of a cutter head embodying the invention. Fig. 3 is a front view of the cutter head provided with bits for grooving the edge of a board. Fig. 4 is a view similar to Fig. 3, showing the cutter head provided with bits arranged to form a tongue. Fig. 5 is a detail view of one of the wedge shaped bolts for securing the bits.

Corresponding and like parts are referred to in the following description, and indicated in all the views of the drawings, by the same reference characters.

The cutter head is designed to operate in a horizontal plane with either side uppermost according to the particular nature of work to be performed. A plurality of slots 1 are formed in one side of the cutter head 2 and alternate with slots 3 formed in the opposite side of the cutter head. The slots 1 and 3 incline in opposite directions with reference to the plane of the cutter head, thereby enabling the cutters to operate by a shear action and to equalize the draft upon the lumber. Other slots 4 are formed in a side of the cutter head and have a greater inclination to radii of the cutter head than the slots 1 and 3. The slots 4 extend to a greater depth than the slots 1, thereby enabling the bits secured therein occupying an approximately central position between the two sides of the cutter head. All the slots 1, 3 and 4 incline with reference to the plane of the cutter head to enable the bits to cut by a shear action. The inner ends of the several slots are enlarged, as indicated at 5, thereby enabling a drift or other type of tool being used for loosening or moving the bits when required. Openings 6 extend transversely through the cutter head and have communication with the respective slots. Wedge shaped bolts 7 are fitted in the openings 6 and their threaded ends receive nuts 8, which may be turned against a side of the cutter head to move the bolt longitudinally so as to bind the bit and hold the same in the required adjusted position. The bolts 7 are of like formation, one end of each being threaded to receive a nut 8 and a side of the bolt being cut away to form a wedge shaped end which tapers toward the threaded end of the bolt. The bolts 7 are prevented from turning when tightening the nuts 8 by the flat side engaging the bit.

The grooving bits are indicated at 9 and are comparatively narrow and when in position occupy a position about midway between the sides of the cutter head. These bits 9 alternately incline in opposite directions so as to cut at their edges and points without engaging frictionally throughout the length of the projecting part. This arrangement prevents overheating of the bits and the burning of the same. The bits 9 may also be arranged to form a groove of desired width which may be wider than the width of a bit because one bit may cut one side of the groove and the next bit may be arranged to cut the opposite side of the groove. The grooving bits 9 are located in the slots 4, hence have a greater inclination than the other bits arranged to cut the edge of the board at the sides of the groove. It is to be understood that the bits 9 may be projected beyond the edge of the cutter head to a greater or less extent according to the depth of the groove to be formed. The other bits 10 secured in the grooves 1 and 3 cut the edge of the board at the sides of the groove.

When the cutter head is arranged to form a tongue along the edge of a board the bits 9 are removed and are replaced by bits 11, which latter are arranged in the plane of the wheel and are grooved along one face to provide a hollow cutting edge of half round form to give a rounded finish to the outer edge of the tongue. The bits 10 are spaced apart from a medial plane a distance to form a tongue of required width. The bits 11 are fitted in the slots 4. Shims 12 of different widths are had to be placed between the inner walls of the slots and the adjacent edges of the bits to properly position the latter, hence by selecting shims of a given width and placing them in the slots the bits may be uniformly positioned according to the work to be performed.

The cutter head may be adapted for ship lap by omitting the bits 9 and 11 and projecting the bits 10 upon one side to a greater distance than the bits upon the opposite side of the cutter head. When the edge of a board is to be finished it is to be understood the bits having cutting edges of proper form may be selected and arranged in position in the cutter head so that the united action of all the bits will result in the formation of an edge having the required outline. The cutter head being solid is not liable to distortion by tightening the bolts to secure the bits. The cutter head may be of any size or form and is adapted to be secured upon its mandrel in any convenient and substantial way.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A cutter head having bit-receiving slots in opposite sides arranged in alternation and terminating in a plane midway between the sides of the cutter head, and other bit-receiving slots formed in a side of the cutter head opposite the spaces between the first mentioned bit-receiving slots and extending beyond the before mentioned medial plane to admit of the bits fitted therein occupying a central position.

2. A cutter head having bit-receiving slots in opposite sides arranged in alternation and inclining similarly longitudinally and transversely, the transverse inclination of the slots upon one side being in an opposite direction to the slots in the opposite side, and other bit-receiving slots formed in a side of the cutter head and inclining transversely and longitudinally, the longitudinal inclination being greater than the relative longitudinal inclination of the first mentioned bit-receiving slots.

3. A cutter head having slots in a side thereof and provided with other slots intermediate of the first mentioned slots and at a greater inclination to radii of the cutter head, the last mentioned slots being deeper than the first mentioned slots.

4. A cutter head provided in opposite sides with slots having an alternate arrangement, bits secured in certain slots and occupying a relatively medial position, and other bits secured in the remaining slots upon opposite sides of the cutter head to operate upon the work at the sides of the part acted upon by the medial bits.

In testimony whereof I affix my signature in presence of two witnesses.

HIRAM G. OLVER.

Witnesses:
E. RIQUELMY,
GEO. P. KOCHER.